US009565358B2

(12) United States Patent
Li (10) Patent No.: US 9,565,358 B2
(45) Date of Patent: Feb. 7, 2017

(54) APPARATUS AND METHOD FOR SCANNING AND RECOGNIZING

(75) Inventor: Yongbin Li, Beijing (CN)

(73) Assignee: HANWANG TECHNOLOGY CO., LTD., Haidian District, Beijing (CN)

( * ) Notice: Subject to any disclaimer, the term of this patent is extended or adjusted under 35 U.S.C. 154(b) by 689 days.

(21) Appl. No.: 13/976,244

(22) PCT Filed: Dec. 27, 2011

(86) PCT No.: PCT/CN2011/084776
§ 371 (c)(1),
(2), (4) Date: Jan. 27, 2014

(87) PCT Pub. No.: WO2012/089116
PCT Pub. Date: Jul. 5, 2012

(65) Prior Publication Data
US 2014/0160232 A1   Jun. 12, 2014

(30) Foreign Application Priority Data

Dec. 27, 2010   (CN) .......................... 2010 1 0607546
May 27, 2011   (CN) .......................... 2011 1 0141320

(51) Int. Cl.
*G06K 9/20*   (2006.01)
*G06K 9/22*   (2006.01)
(Continued)

(52) U.S. Cl.
CPC .......... *H04N 5/23238* (2013.01); *G06K 9/222* (2013.01); *G06K 9/3275* (2013.01); *G06K 2009/2045* (2013.01); *G06K 2209/01* (2013.01)

(58) Field of Classification Search
None
See application file for complete search history.

(56) References Cited

U.S. PATENT DOCUMENTS 5,649,032 A  *  7/1997  Burt .......................... G06K 9/32
                                                  348/588
2006/0152589 A1*  7/2006  Morrison ............... G06K 9/209
                                                  348/208.1

(Continued)

FOREIGN PATENT DOCUMENTS

CN          1160657 C       8/2004
CN         201562284 U      8/2010
(Continued)

OTHER PUBLICATIONS

International Search Report for corresponding International Patent Application No. PCT/CN2011/084776 mailed Mar. 15, 2012.

*Primary Examiner* — Reza Aghevli
(74) *Attorney, Agent, or Firm* — Merchant & Gould P.C.

(57) ABSTRACT

Apparatus for scanning and recognizing characters comprises: an optical sensor for capturing images, which optical sensor carries out continuous shooting of the scanned characters to obtain an image frame sequence containing the scanned characters, and the content of an image frame partly overlaps content of the previous image frame in the sequence; and a control module for processing the images and recognizing the characters. The control module divides the image frames in the image frame sequence into groups of image frames including reference frames, skip frames and predictive frames according to the overlapping contents, and combines the standard frames and the predictive frames into a panorama image, taking a group of image frames as a unit, and carries out character recognition after performing skew correction based on the panorama image, to obtain the character codes of the scanned characters. The skip frames can be skipped directly, increasing the splicing speed.

18 Claims, 6 Drawing Sheets

(51) Int. Cl.
*G06K 9/32* (2006.01)
*H04N 5/232* (2006.01)

(56) References Cited

U.S. PATENT DOCUMENTS

| | | | | |
|---|---|---|---|---|
| 2007/0031062 A1* | 2/2007 | Pal | ............... | G06F 17/30843 |
| | | | | 382/284 |
| 2009/0021576 A1* | 1/2009 | Linder | ............... | G03B 37/00 |
| | | | | 348/36 |
| 2010/0027663 A1* | 2/2010 | Dai | ............... | H04N 19/159 |
| | | | | 375/240.16 |
| 2010/0148066 A1* | 6/2010 | Stratmann | ............... | H04N 5/232 |
| | | | | 250/330 |
| 2010/0265313 A1* | 10/2010 | Liu | ............... | G06T 3/4038 |
| | | | | 348/36 |
| 2011/0043604 A1* | 2/2011 | Peleg | ............... | G06T 3/4038 |
| | | | | 348/36 |

FOREIGN PATENT DOCUMENTS

| | | |
|---|---|---|
| CN | 101853524 A | 10/2010 |
| CN | 102156867 A | 8/2011 |

\* cited by examiner

Nonlinear aberration correction of lens in image mosaic

Fig. 7

Nonlinear aberration correction of lens in image mosaic

Fig. 8

| serial numbers of the image frames | image frame | combining coefficience | horizontal displacement for jointing | | | vertical displacement for jointing | | | direction for jointing | | | frame attribution |
|---|---|---|---|---|---|---|---|---|---|---|---|---|
| | | | predicting value | calculating value | updating value | predicting value | calculating value | updating value | predicting value | calculating value | updating value | |
| 1 | | – | – | – | 0 | – | – | 0 | – | – | Low Right | predicting value |
| 2 | | 0.9123 | 0 | 0 | 0 | 0 | 0 | 0 | Low Right | Low Right | Low Right | reference frame |
| 3 | | – | – | – | – | – | – | – | – | – | – | skipping frame |
| 4 | | – | – | – | – | – | – | – | – | – | – | skipping frame |
| 5 | | – | – | – | – | – | – | – | – | – | – | skipping frame |
| 6 | | 0.8854 | 0 | 5 | 2 | 0 | 0 | 0 | Low Right | Low Right | Low Right | predicting frame |
| ...... | ...... | ...... | ...... | ...... | ...... | ...... | ...... | ...... | ...... | ...... | ...... | ...... |
| 121 | | 0.8807 | 24 | 25 | 8 | 8 | 9 | 3 | Low Right | Low Right | Low Right | predicting frame |
| 122 | | 0.8847 | 8 | 9 | 9 | 3 | 3 | 3 | Low Right | Low Right | Low Right | reference frame |
| 123 | | – | – | – | – | – | – | – | – | – | – | skipping frame |
| 124 | | 0.8915 | 21 | 19 | 10 | 6 | 7 | 4 | Low Right | Low Right | Low Right | predicting frame |
| ...... | ...... | ...... | ...... | ...... | ...... | ...... | ...... | ...... | ...... | ...... | ...... | ...... |
| 194 | | 0.8832 | 37 | 38 | 38 | 7 | 7 | 7 | Low Right | Low Right | Low Right | predicting frame |
| 195 | | 0.8769 | 38 | 38 | 38 | 7 | 8 | 8 | Low Right | Low Right | Low Right | reference frame |
| 196 | | 0.8704 | 38 | 37 | 37 | 8 | 8 | 8 | Low Right | Low Right | Low Right | predicting frame |
| ...... | ...... | ...... | ...... | ...... | ...... | ...... | ...... | ...... | ...... | ...... | ...... | ...... |

Fig. 6

APPARATUS AND METHOD FOR
SCANNING AND RECOGNIZING

This application is a National Stage Application of PCT/CN2011/084776, filed 27 Dec. 2011, which claims benefit of Serial No. 201010607546.5, filed 27 Dec. 2010 in China and Serial No. 201110141320.5, filed 27 May 2011 in China, and which applications are incorporated herein by reference. To the extent appropriate, a claim of priority is made to each of the above disclosed applications.

FIELD OF INVENTION

The present invention belongs to a field of computer peripheral equipment and relates to an apparatus and a method for scanning and recognizing characters, especially to an apparatus and a method for scanning and recognizing selected character sequence.

DESCRIPTION OF PRIOR ART

An electronically scanning pen (hereafter called as a scanning pen) is one important application of OCR (Optical Character Recognition). The optical camera of the scanning pen continuously takes photos of scanned documents at some frequencies, image frame sequence of the scanned documents is obtained and the image frame sequence is then combined to one panorama to perform OCR processing.

In order to support high scanning speed and to improve the users' experience, the scanning pen is operated to capture images at a high image capturing frequencies and to perform real-time combining processing, e.g. capturing 120 or more image frames per second. In order to ensure a high recognition rate, the accuracy of image stitch should be higher, so correspondingly some image combining method with high speed but a lower accuracy of image stitch may be insufficient to be employed. Thus, in a case where the scanning pen obtains a great number of data of image frame sequence, the conventional image combining processing method can't take account of speed ability and accuracy.

In addition, when the user uses the scanning pen to scan, its scanning speed is varied. One typical manner of using the scanning pen is that when the scanning begins, the scanning speed of the scanning pen is gradually increased from zero and reaches a speed peak, and then the speed is gradually decreased until the scanning is ended. In a case where it is ensured that there are some overlapping contents between the neighboring image frames at the speed peak, the lower the scanning speed is, the more overlapping contents between the neighboring image frames are. In other words, when the scanning speed is low, not only there are overlapping contents between the current image frame and its previous one image frame, but also it is likely that there are overlapping contents between the current image frame and one or more image frames proceeding to the previous one image frame. When the scanning speed is very low, there are some certain overlapping contents between the current image frame and one or more image frames proceeding to the previous one image frame.

In addition, as the hardware technique is developed, in order to increase the scanning speed peak supported by the scanning pen and to improve the user's experience, an optical sensor with a higher sampling frequency may be employed. When the sampling frequency of the optical sensor of the scanning pen is increased, the possibility that there are certain overlapping contents between the current image frame and one or more image frames preceding to the previous one image frame at the same scanning speed is higher than the case of the lower sampling frequency.

A patent with announcement number of grant of CN1160657C discloses a method and an apparatus of recording character. When the apparatus scans the selected character sequence, the optical sensor synchronistically records a plurality of images with partially overlapping contents. A signal processing unit combines these images horizontally and vertically into one panorama image, recognizes the characters in the panorama image and stores the recognized characters in the apparatus. However, the signal processing unit of such an invention may only combine each image frame with its previous one image frame vertically and horizontally by the overlapping contents, thus the neighboring image frames of every two frames have to be combined. If there are some overlapping contents between the current image frame and one or more of image frames preceding to its previous one frame, the manner of combining and combining the neighboring image frames of every two frames increases the load of the signal processing unit, occupies hardware resource and reduces the speed of combining the whole image frame sequence.

SUMMARY OF THE INVENTION

The present invention provides an apparatus and a method of scanning and recognizing characters. By selecting image frames from the captured image frame sequence and combining the resultant image frames according to the overlapping contents, the processing load of a control module is reduced and the speed of combining the image frame sequence is increased.

The present invention provides an apparatus of scanning and recognizing characters, comprising:

an optical sensor for capturing images, the optical sensor continuously capturing scanned characters to obtain an image frame sequence containing the scanned characters, each image frame in the image frame sequence containing contents which partially overlaps with the contents of its previous frame; and a control unit for processing images and recognizing characters, according to the overlapping contents, the control unit dividing the image frames in the image frame sequence into groups of image frames in which each group includes a reference frame, a predictive frame and maybe some skip frame, and combining the reference frame and the predictive frame to a panorama image group by group, performing an inclination correction based on the panorama image and performing a character recognition to get the character codes of the scanned characters;

Among others, the control unit comprising:

a setting unit for setting a frame attribution of the current frame in the image frame sequence to form groups of image frames, which includes the reference frame, the predictive frame and the skipping frame, the reference frame is a first frame of one group of image frames, the skipping frames are the image frames between the reference frame and the predictive frame, the number of the skipping frame is determined by the overlapping contents among the image frames, and the predictive frame is a last frame in one group of image frames;

a predicting unit for calculating a predictive value of the combining information for the current frame according to an updated value of the combining information for a previous image frame which has a combining information, if the frame attribution of the current frame is a reference frame or a predictive frame;

a selecting unit for evaluating candidate values of the combining information for the current frame according to the predictive value of combining information for the current frame, to obtain a calculating value of the combining information for the current frame;

an updating unit for calculating an updating value of the combining information for the current frame according to the calculating value of the combining information for the current frame and turning to the updating value to the setting unit until the updating value of the combining information for all reference frame and predictive frames in the image frame sequence have been calculated;

a merging unit for combining image frames to panorama image according the calculating value of the combining information for the respective reference frame and predictive frame obtained by the selecting unit.

The present invention also discloses a method of scanning and recognizing characters, comprising the following steps:

a step of 1) continuously capturing scanned characters to obtain an image frame sequence containing characters, each image frame in the image frame sequence containing contents which partially overlaps with the contents of its previous frame;

a step of 2) according to the overlapping contents, dividing the image frames in the image frame sequence into groups of image frames in which each group includes a reference frame, a predictive frame and maybe some skip frames, and combining the reference frame and the predictive frame to a panorama image group by group;

a step of 3) performing an inclination correction on the panorama image and performing a character recognition to get the character codes of the characters.

The step of 2) particularly comprises:

a step of a) setting a frame attribution for the current frame in the image frame sequence to form groups of image frames, which includes the reference frame, the predictive frame and maybe some skip frames, the reference frame is a first frame of one group of image frames, the skip frames are the image frames between the reference frame and the predictive frame, the numbers of the skip frame is determined by the overlapping contents among the image frames, and the predictive frame is a last frame in one group of image frames;

a step of b) calculating a predictive value of the combining information for the current frame according to an updated value of the combining information for a previous image frame which has a combining information, if the frame attribution of the current frame is a reference frame or a predictive frame;

a step of c) evaluating candidate values of the combining information for the current frame according to the predictive value of combining information for the current frame to obtain a calculating value of the combining information for the current frame;

a step of d) calculating an updating value of the combining information for the current frame according to the calculating value of the combining information for the current frame and turning to the step a) until the updating value of the combining information for respective reference frame and predictive frame in the image frame sequence have been calculated;

a step of e) combining to obtain a panorama image according to the calculating value, obtained by the step of c), of the combining information for all the reference frame and predictive frames.

The apparatus and method for scanning and recognizing characters disclosed by the present invention reduces the processing load of the control module and improves the speed of combining image frames by the control module selecting the image frames in the image frame sequence captured in the optical sensor and combining according to the resultant overlapping contents in the image frame to be jointed.

In the figures,
1 shell
2 control module
3 circuit board
4 battery
5 optical sensor
6 key
7 memory
8 liquid crystal screen
9 USB module
10 display unit
11 TTS module
12 lens group
13 illumination unit

DETAILED DESCRIPTION OF PREFERRED EMBODIMENTS

The technical solutions in the embodiment of the present invention will be definitely and completely illustrated by combining with the accompany figures of the embodiment of the present invention. It is apparent that the illustrated embodiments are only some embodiments of the present invention and are not all the embodiments. On the basis of the embodiments of the present invention, all the other embodiments obtained by those skilled in the art fall into the scope of the present invention.

Figure 1:
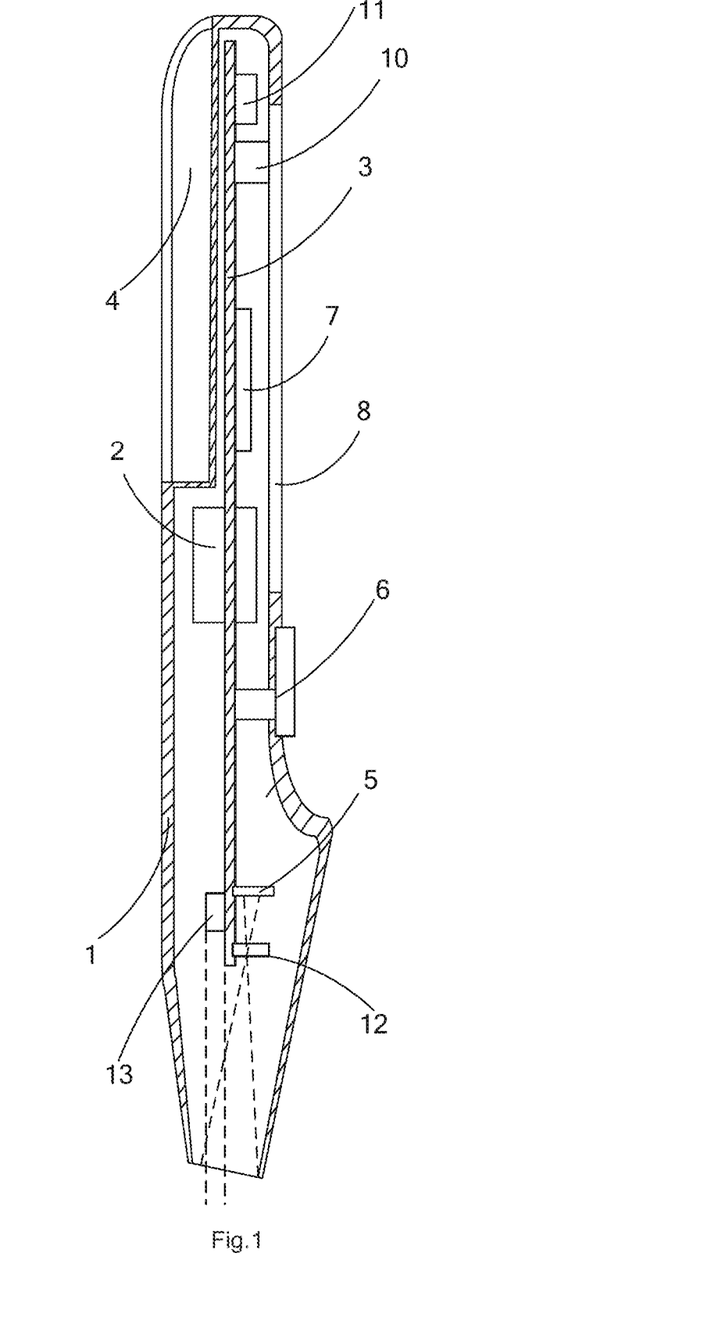
FIG. 1 is a schematic view of the apparatus of scanning and recognizing characters according to the present invention.
Figure 2:
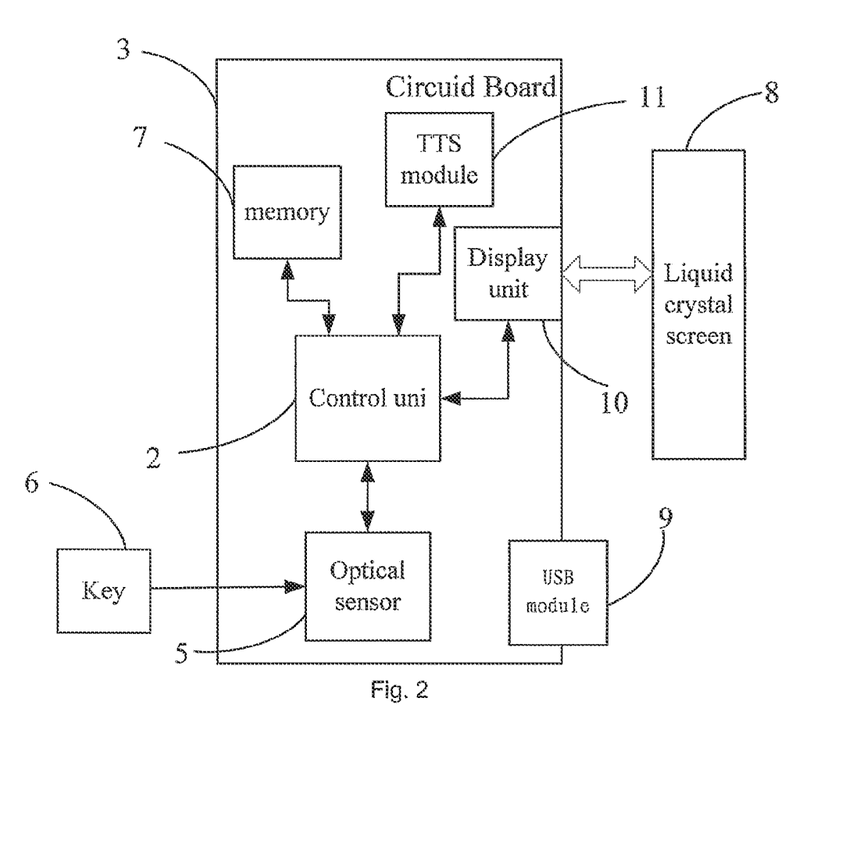
FIG. 2 is a structural block diagram of the apparatus of scanning and recognizing characters according to the present invention.

The present invention discloses an apparatus of scanning and recognizing characters. As shown in FIG. 1 and FIG. 2, it comprises the following components: a shell 1 for packaging and fixing components of the apparatus; a control module 2 for processing images and recognizing characters; a circuit board 3 for integrating the components; a battery 4 for supplying power to the respective components of the apparatus; an optical sensor 5 for imaging the characters; a key 6 for triggering an operation of capturing; a memory 7 for loading a signal processing procedure; a liquid crystal screen 8 for displaying output information; a USB module 9 for connecting to a computer; a display unit 10 for driving the liquid crystal screen 8; and a TTS module 11 for outputting voice. The circuit board 3 integrates the optical sensor 5, the memory 7, the control module 2, the display unit 10, the TTS module 11 and the USB module 9. The shell 1 packages the liquid crystal screen 8, the battery 4, the key 6 and the circuit board 3. The key 6 is connected to the optical sensor 5 on the circuit board 3 to send a control signal to the optical sensor 5. The optical sensor 5 continuously captures the characters in the text page to obtain the image frame sequence containing the characters, and each image frame in the image frame sequence containing contents which partially overlaps with the contents of its previous frame. According to the overlapping contents, the control module 2 divides the image frames in the image frame sequence into groups of image frames in which each group includes a reference frame, predictive frame and maybe some skip frames, and the reference frame and the predictive frame are combined to a panorama image group by group. An inclination correction is performed based on the panorama image, and then character recognition is performed by calling the recognizing engine in the memory 7 to get the character codes of the characters.

As shown in FIG. 2, the control module 2 is connected to the memory 7, the optical sensor 5, the display unit 10 and the TTS module 11. Under the control of the control module 2, the user triggers through the key 6 and sends a control signal to the optical sensor 5. The optical sensor 5 performs capturing of image information to get the image frame sequence, each image frame of in the image frame sequence contains content which partially overlaps with the contents of its previous image.

The control module 2 divides the image frames in the image frame sequence into groups of image frames in which each group includes a reference frame, a predictive frame and skip frames which may be present according to the overlapping contents, and the reference frame and the predictive frame are combined to a panorama image group by group. An inclination correction is performed based on the resultant panorama image obtained by combining, character recognition is performed by calling the recognizing engine in the memory 7 to get the character codes of the characters, and the character codes are stored in the memory 7. The display unit 10 fetches the character stored in the memory 7 and displays the recognized characters on the liquid crystal screen 8. The control module 2 sends the character codes of the character to the TTS module 11 according to the control signal and the TTS module 11 outputs a real human's.

The control module 2 comprises:

a setting unit for setting a frame attribution of the current frame in the image frame sequence to form groups of image frames, which includes the reference frame, the predictive frame and the skip frame, the reference frame is a first frame of one group of image frames, the skip frames are the image frames between the reference frame and the predictive frame, the number of the skip frames is determined by the overlapping contents among the image frames, and the predictive frame is a last frame in one group of image frames;

a predicting unit for calculating a predictive value of the combining information for the current frame according to an updated value of the combining information for a previous image frame which has a combining information, if the frame attribution of the current frame is a reference frame or a predictive frame;

a selecting unit for evaluating candidate values of the combining information for the current frame according to the predictive value of combining information for the current frame, to obtain a calculating value of the combining information for the current frame;

an updating unit for calculating an updating value of the combining information for the current frame according to the calculating value of the combining information for the current frame and turning to the setting unit until the updating value of the combining information for all the reference frame and predictive frame in the image frame sequence have been calculated;

a merging unit for combining to obtain a panorama image according to the calculating value of the combining information for all the reference frame and predictive frame obtained by the selecting unit.

As shown in FIG. 1, the apparatus of the present invention further comprises a lens group 12 for capturing image information; an illumination unit 13 for illuminating the scanned characters. The lens group 12 has a focus of 5-7 mm and apertures greater than 10, which ensures that the lens group 12 has a field depth of 30-50 mm, which may effectively scans the information of characters and get a favorable effect. When the user scans the character images, the illumination unit 13 is in a state of ON. The illumination unit 13 emits a light beam and forms a light spot on the scanned characters. Meanwhile, the lens group 12 captures image information positioned by the illumination unit 13 to the optical sensor integrated on the circuit board 3. The optical sensor 5 continuously captures the characters and obtains an image frame sequence containing the characters, and each image frame in the image frame sequence contains content which partially overlaps with the contents of its previous image frames. The control module 2 divides the image frame sequence into groups of image frames according to the overlapping contents of the image frame, selects the image frames in the group of image frames to get the image frame to be combined, and combines the corresponding image frames to be jointed in the respective groups of image frames. One group of image frames comprising a reference frame, a predictive frame and a skipping frame which may be or may be not present. Only the reference frame and the predictive frame in the group of image frames are used to joint to combine a panorama image. The number of the skip frames in one group of image frames is more than or equal to zero.

When the apparatus of the present invention is utilized to select the scanned characters, the key 6 is pressed to control the control module 2 to send a control signal to the optical sensor 5. When the scanned characters are selected, the optical sensor 5 synchronistically and continuously captures the character images in the text pages to get the image frame sequence containing the characters. In the present embodiment, the sampling rate of the optical sensor 5 reaches 120 frames per second. When the key 6 is released, the optical sensor 5 stops capturing the character images and this process of scanning image ends. An inclination correction is performed based on the panorama image obtained by combining. Then character recognition is performed by calling the recognizing engine in the memory 7 to get the character codes of the characters, and the character codes are stored in the memory 7.

Figure 3:
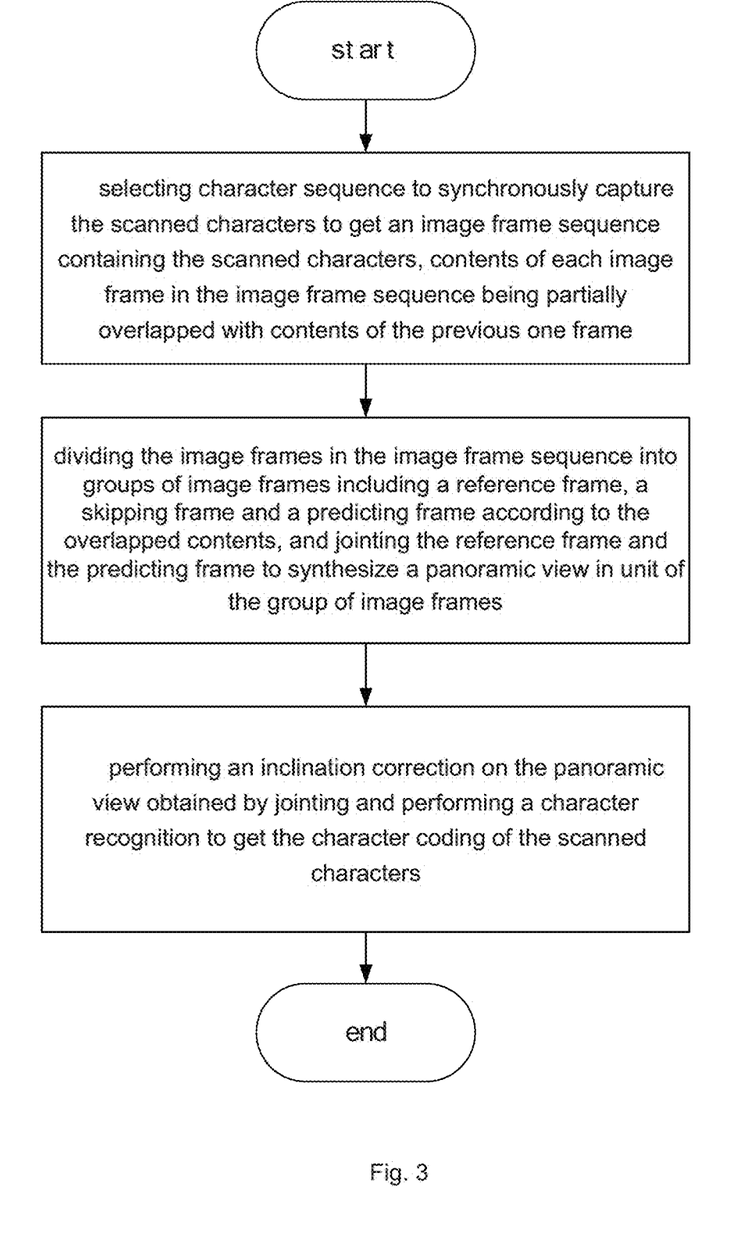
FIG. 3 is a flowchart of the method of scanning and recognizing characters according to the present invention.

The present invention also discloses a method of scanning and recognizing characters. As shown in FIG. 3, the method comprises the following steps:

a step of 1) continuously capturing character images to obtain an image frame sequence containing the characters, each image frame in the image frame sequence containing contents which partially overlaps with the contents of its previous frame;

a step of 2) according to the overlapping contents, dividing the image frames in the image frame sequence into groups of image frames in which each group includes a reference frame, a predictive frame and some skip frames which may be present, and combining the reference frame and the predictive frame to a panorama image group by group;

a step of 3) performing an inclination correction based on the panorama image and performing a character recognition to get the character codes of the characters.

Figure 4:
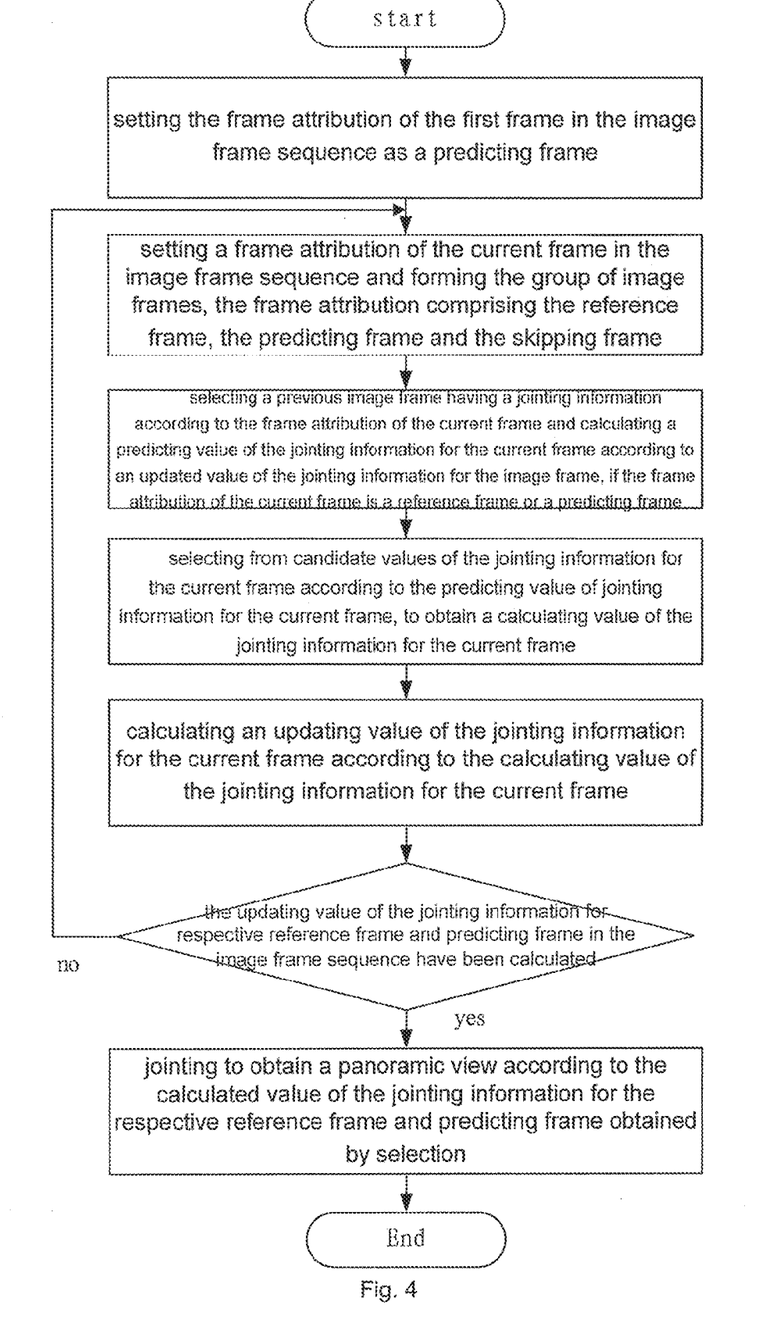
FIG. 4 is another flowchart of the method of scanning and recognizing characters according to the present invention.

As shown in FIG. 4, the step of 2) particularly comprises:

a step of a) setting a frame attribution of the current frame in the image frame sequence to form the group of image frames, which includes the reference frame, the predictive frame and the skip frame, the reference frame is a first frame of one group of image frames, the skip frames are the image frames between the reference frame and the predictive frame, and the numbers of the skip frames is determined by the overlapping contents among the image frames, and the predictive frame is a last frame in the group of image frames;

a step of b) calculating a predictive value of the combining information for the current frame according to an updated value of the combining information for a previous image frame which has a combining information, if the frame attribution of the current frame is a reference frame or a predictive frame;

a step of c) evaluating candidate values of the combining information for the current frame according to the predictive value of combining information for the current frame, to obtain a calculating value of the combining information for the current frame;

a step of d) calculating an updating value of the combining information for the current frame according to the calculating value of the combining information for the current frame and turning to the step of a) until the updating value of the combining information for respective reference frame and predictive frame in the image frame sequence have been calculated; and a step of e) combining frame images to obtain a panorama image according to the calculating value, obtained by the step of c), of the combining information for all the reference frames and predictive frames.

The detailed operations of the respective steps a)-d) are particularly illustrated in the following.

Figure 6:
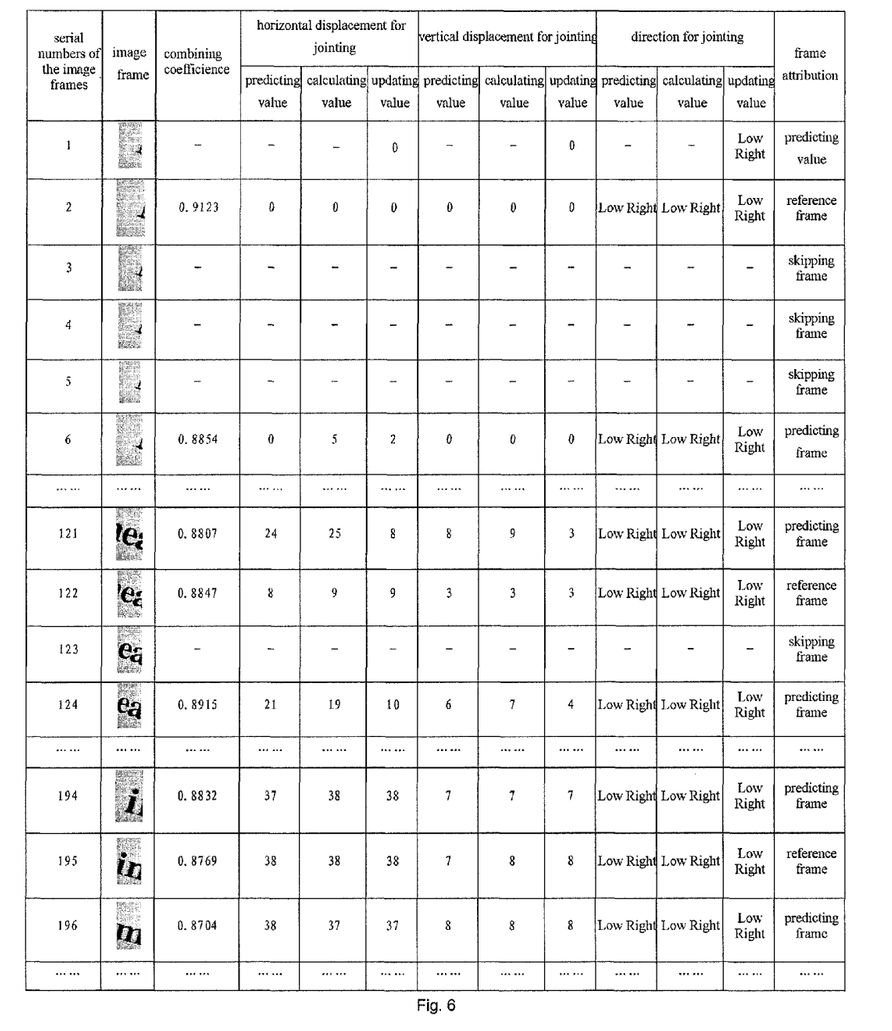
FIG. 6 is a schematic view of the respective image frame and the relevant data in embodiments of the method of scanning and recognizing characters according to the present invention.

Prior to the step of a), the first frame of the image frame sequence is specially processed as follows: the frame attribution of the first frame in the image frame sequence is set as a predictive frame. An updating value for its horizontal displacement for combining is set as 0, an updating value for its vertical displacement for combining is set as 0, and an updating value for the direction of combining is set as Low Right. In the present embodiment, the image frame with an image frame number of 1 as shown in FIG. 6 is the first frame of the image frame sequence of the present embodiment.

In the step of a), when the two image frames are jointed, the previous one is called as a template frame and the subsequent one is called as a current frame. The combining information between the two image frames comprises a horizontal displacement for combining, a vertical displacement for combining and a direction for combining. The predictive value of the combining information refers to the combining information for the current frame with respect to the template frame which is obtained by predicting. The calculating value of the combining information refers to the combining information for the current frame with respect to the template frame which is obtained by calculating. The updating value of the combining information refers to the combining information for the current frame with respect to the directly previous one image frame of the current frame, which is obtained by calculation.

When the image frame sequence is divided into groups of image frames, each image frame in one group of image frames may be a reference frame, a skip frame, or a predictive frame, which is the frame attribution of the image frame. If the current frame has a frame attribution, such a step is skipped over; otherwise, the following processing is performed according to the frame attribution of the previous one frame of the current frame:

if the frame attribution of the previous one frame of the current frame is a predictive frame, the frame attribution of the current frame is set as a reference frame; and if the frame attribution of the previous one frame of the current frame is a reference frame, the previous one image frame of the current frame is the start of a new group of image frames, the number of the skip frames in one group of image frames is calculated according to the updating value of combining information for the previous one image frame; the frame attribution of the last frame in one group of image frames is set as a predictive frame and the frame attribution information of the image frames between the reference frame and the predictive frame are set as a skip frame.

Figure 5:
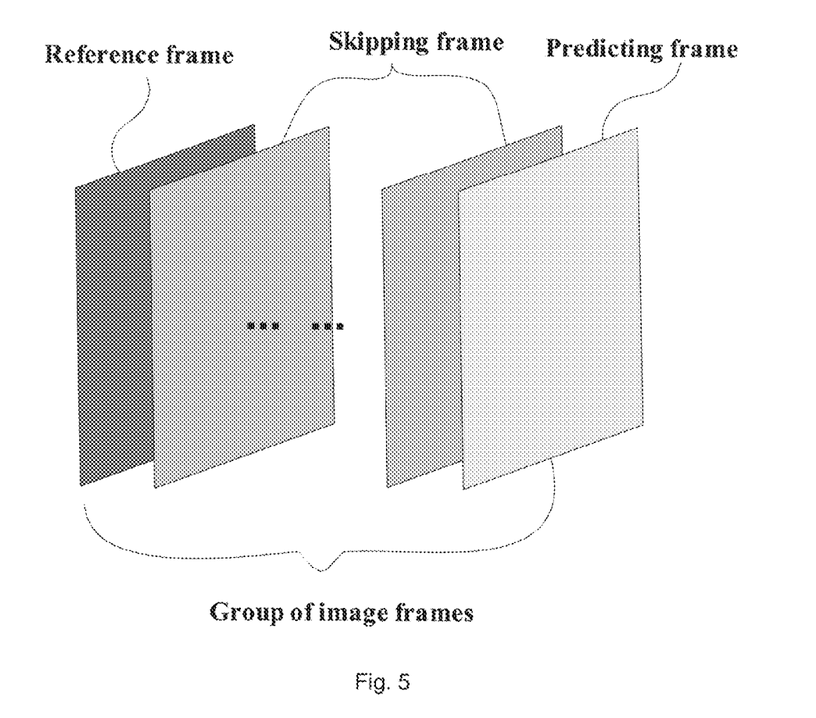
FIG. 5 is a schematic view of one group of image frames in the method of scanning and recognizing characters according to the present invention.

The first frame in the image frame sequence is used for initiation, and the remaining image frames are divided into a plurality of continuous groups of image frames according to the displacement distance between the image frames. The structure of one group of image frames is shown in FIG. 5, i.e. its first frame is a reference frame, its last frame is a predictive frame and the image frames between the reference frame and the predictive frame are skip frames. For one group of image frames, the reference frame and the predictive frame are necessary. The number of the skip frames is determined according to the updating value of the displacement for combining among the image frames. The number of the skip frames may be zero or may be multiple. There may be or may not a skip frame in one group of image frames of the present method. If the reference frame and the template frame are two image frames which are directly adjacent to each other in timing sequence, the number of the skip frame is zero; and if there skip frames between the reference frame and the template frame, the numbers of skip frames may be multiple.

All the image frames relevant to the present embodiment are shown in FIG. 6. In particularly, FIG. 6 comprises the serial numbers of the image frames, the image frames, combining coefficience, a predictive value of horizontal displacement for combining, a calculating value of horizontal displacement for combining, an updating value of horizontal displacement for combining, a predictive value of vertical displacement for combining, a calculating value of vertical displacement for combining, an updating value of vertical displacement for combining, a predictive value of the direction for combining, a calculating value of the direction for combining, an updating value of direction for combining, and a frame attribution. The combing coefficience is metrics for calculating the degree for combining the image frames. There are four values of the direction for combining which are Low Right, High Right, Low Left, and High Left. There are three values of the frame attribution, which are a reference frame, a skip frame and a predictive frame. In the present embodiment, the size of the respective image frames is 160×80, and the sampling rate is 120 frames/second. In the embodiment, the image frame with a serial number of X is called as the $X^{th}$ image frame, for sake of illustration.

In the present embodiment, the method for calculating the numbers of the skip frames in the respective group of image frames is shown as follows:

since the sampling rate of the apparatus for scanning and recognizing characters is 120 frames per second, when the bigger one of the updating value of the horizontal displacement for combining and the updating value of the vertical displacement for combining for the previous one image frame of the current frame is less than or equal to 4, the number of the skip frames in the group of image frames is 3;

since the sampling rate of the apparatus for scanning and recognizing is 120 frames per second, when the bigger one of the updating value of the horizontal displacement for combining and the updating value of the vertical displacement for combining for the previous one image frame of the current frame is more than 4 but less than or equal to 8, the number of the skip frames in the group of image frames is 2;

since the sampling rate of the apparatus for scanning and recognizing characters is 120 frames per second, when the bigger one of the updating value of the horizontal displacement for combining and the updating value of the vertical displacement for combining for the previous one image frame of the current frame is more than 8 but less than or equal to 16, the number of the skip frames in the group of image frames is 1;

since the sampling rate of the apparatus for scanning and recognizing characters is 120 frames per second, when the bigger one of the updating value of the horizontal displacement for combining and the updating value of the vertical displacement for combining for the previous one image frame of the current frame is more than 16, the number of the skip frames in the group of image frames is 0.

As shown in FIG. 6, for the $2^{nd}$ frame, since the frame attribution of the previous one image frame is a predictive frame, the frame attribution of the $2^{nd}$ image frame is set as a reference frame. For the $3^{rd}$ frame, since the frame attribution of the previous one image frame is a reference frame and the bigger one of the updating value of the horizontal displacement for combining and the updating value of the vertical displacement for combining for the previous one image frame is 0, which is less than or equal to 4, the number of the skip frames is set as 3. That is to say, the frame attribution of the $3^{rd}$, $4^{th}$ and $5^{th}$ image frames are skip frames and the frame attribution of the $6^{th}$ frame is a predictive frame. For example again, for the $123^{rd}$ image frame, the frame attribution of the previous one image is a reference frame, and the bigger one of the updating value of the horizontal displacement for combining and the updating value of the vertical displacement for combining for the previous one image frame is 9, which is more than 8 and less than or equal to 16, the number of the skip frames is set as 1. That is to say, the frame attribution of the $123^{rd}$ image frame is a skip frame, and the frame attribution of the $124^{th}$ image is a predictive frame. For example again, for the $196^{th}$ image frame, the frame attribution of its previous one image frame is a reference frame, and the bigger one of the updating value of the horizontal displacement for combining and the updating value of the vertical displacement for combining for the previous one image frame is 38, which is more than 16, the number of the skip frame is set as 0. That is to say, the frame attribution of the $196^{th}$ image frame is a predictive frame.

In the step of b), the combining information for the image frame comprises the direction for joining the image frame, the horizontal displacement for combining the image frames and the vertical displacement for combining the image frames. If the current frame is a reference frame or a predictive frame, when the predictive value of the combining information for the current frame is calculated, the step of calculating the combining information for the current frame with respect to the template frame is particularly embodied as follows:

If the current frame is a reference frame, the updating value of the corresponding combining information for the previous image frame of the current frame is regarded as the predictive value of the combining information for the current frame.

If the current frame is a predictive frame, the predictive value of the combining information for the current frame is calculated according to the updating value of the combining information corresponding to the reference frame of the current group of image frames. The updating value of the direction for combining of the reference frame of the current group of image frames is regarded as the predictive value of the direction for combining of the current frame. A calculation is performed according to the updating value of the horizontal displacement for combining of the reference frame of the current group of image frames, the updating value of the horizontal displacement for combining of the previous one image frame for the reference frame of the current image frame and the number of the skip frames in the current group of image frames, to obtain the predictive value of the horizontal displacement for combining of the current frame. A calculation is performed according to the updating value of the vertical displacement for combining of the reference frame of the current group of image frames, the updating value of the vertical displacement for combining of the previous image frame for the reference frame of the current image frame and the number of the skip frames in the current group of image frames, to obtain the predictive value of the vertical displacement for combining of the current frame.

In the present embodiment, the apparatus for scanning and recognizing characters takes uniformly accelerated motion. The horizontal displacement for combining of the respective image frames is taken as an example. When the current frame is a predictive frame, on the assumption that the updating value of the horizontal displacement for combining of the previous one image frame of the reference frame in the current group of image frames is $s_0$, the updating value of the horizontal displacement for combining of the reference frame in the current group of image frames is $s_b$, and the number of the skip frames in the current group of image frames is n, so the predictive value of the horizontal displacement for combining of the current frame is $(n+1)s_b+(n+1)(n+2)(s_b-s_0)/2$.

As shown in FIG. 6, if the $2^{nd}$ frame is a reference frame, the updating value of the combining information for the previous one image frame is regarded as the predictive value of the combining information for the current frame. For example, if the $6^{th}$ image frame is a predictive frame, the reference frame for the current group of image frames is the $2^{nd}$ image frame, the number of the skip frame is 3, so the updating value of the direction for combining of the $2^{nd}$ image frame is regarded as the predictive value of the direction for combining of the $6^{th}$ image frame, the updating value of the horizontal displacement for combining of the $1^{st}$ image frame is 0, the updating value of the horizontal displacement for combining of the $2^{nd}$ image frame is 0, and the predictive value of the horizontal displacement for combining of the current image frame is $(3+1)\times 0+(3+1)(3+2)(0-0)/2=0$. In similar manner, it may be obtained by calculation that the predictive value of the vertical displacement for combining of the current image frame is 0. For example, if the $124^{th}$ image frame is a predictive frame, the reference frame for the current group of image frames is the $122^{nd}$ image frame and the number of the skip frame is 1, the updating value of direction for combining of the $122^{nd}$ image frame is regarded as the predictive value of the direction for combining, the updating value the horizontal displacement for combining of the $121^{st}$ image frame is 8, and the updating value of the horizontal displacement for combining of the $122^{nd}$ image frame is 9, so the predictive value of the horizontal displacement for combining of the current image frame is $(1+1)\times 9+(1+1)(1+2)(9-8)/2=21$. In similar manner, it may be obtained by calculation that the predictive value of the vertical displacement for combining of the current image frame is 6.

In the step of c), after the predictive value is obtained, a filter window centered on the predictive value of the combining information for the current frame is formed. The combining coefficient for each pixel within the filter window is calculated and the combining information at the pixel corresponding to the maximum of the combining coefficience is regarded as the calculating value of the combining information for the current frame.

During combining the images, firstly, the combining information is calculated on the basis of some metrics. In fact, there is only one optimum position for combining images between the two image frames. However, it is likely that the optimum position for combining obtained from the metrics is not the actual optimum position for combining, which may leads to error of combining. In order to ensure the correctness of combining, a filter window centered on the predictive value of the combining information for the current frame is formed, the combining coefficience at each pixel within the filter window is calculated and the combining information at the pixel corresponding to the maximum of the combining coefficience is regarded as the calculating value of the combining information for the current frame. The combining coefficience is the value which is obtained by the following step of: dividing the number of the black pixels which is superpositioned at the overlapping regions of the two image frames after binarization by the total number of the black pixels within the overlapping region. In the present embodiment, as shown in FIG. 6, the predictive value of the direction for combining for the $196^{th}$ image frame is Low Right, the predictive value of the horizontal displacement for combining is 38 and the predictive value of the vertical displacement for combining is 8. BA predicting window is centered on the predictive value and has a size of 11×11. The combining coefficient of all the pixels within the predicting window are calculated to get that the maximum of the combining coefficients is 0.8704 and relative coordinate of the corresponding pixel in the predicting window is (3,1). The combining information at such a point is regarded as the calculating value of the combining information, and it is obtained that the calculating value of the combining information along the horizontal direction is 37 and the calculating value of the combining information along the vertical direction is 8. In order to ensure the correctness of combining, the combining information corresponding to several candidate combining positions may be selected as the candidate value of the combining information according to the metrics, and then the candidate value of the optimum combining information is evaluated according to the predictive value of the combining information. The candidate value for the combining information is the combining information corresponding to the one or more candidate combining positions of the image frame selected according to the metrics.

In the present embodiment, when the candidate values of the combining information for the current frame and the reference frame in the current group of image frames is calculated, the two image frames are binarized, and the pixel value of the white pixel in the two image frames after binarization is 0 and the pixel value of the black pixel is 1. Then, the candidate value of the combining information is calculated according to the combining coefficience of the two image frames which have been binarized. The combining coefficience is the value which is obtained by the number of the black pixels superpositioned at the overlapping regions of the two image frames after binarization being divided by the total number of the black pixels within the overlapping region.

When the candidate value of the combining information is calculated, the corresponding combining coefficient for all the possible combining positions of the two image frames are calculated firstly and then the candidate values for the combining information are selected in an iterative manner according to the resultant combining coefficient as follows:

a step of 301, the maximum combining coefficient is selected from the combining coefficient corresponding to all the possible combining positions and the combining information corresponding to the maximum combining coefficient is regarded as the candidate value for the first combining information;

a step of 302, the candidate value for the combining information is selected in an iterative manner as follows: the combining coefficient for all the combining positions within a 5×5 window which is centered on the position corresponding to the candidate value and has a radius of 2 are set as 0; the maximum value is selected from the combining coefficient corresponding to all the combining positions; if the resultant maximum value is more than or equal to 0.8 times of the maximum combining coefficient in the step of 301, the combining information corresponding to the maximum value is regarded as a candidate value of the combining information; such a step is repeated until the maximum value of the combining coefficient obtained by selection is less than 0.8 times of the maximum combining coefficient in the step of 301, the calculation for the candidate values of the combining information for the current frame is ended.

As shown in FIG. 3, when the current frame is a reference frame or a predictive frame, the candidate value of the combining information for the current frame is calculated. The $196^{th}$ image frame has two candidate values for the combining information, which are the first candidate value and the second candidate value, respectively. For the first candidate value, its direction for combining is Low Right, its horizontal displacement for combining is 4 and its vertical displacement for combining is 0; and for the second candidate, its direction for combining is Low Right, its horizontal displacement for combining is 37 and its vertical displacement for combining is 8.

If there is only one candidate value for the combining information corresponding to the two image frames of the reference frame and the predictive frame, there is only one corresponding combining position for the two image frames. Thus, the candidate value of the combining information is directly regarded as the calculating value of the combining information corresponding to the two image frames. If there are more than one candidate values for the combining information, there are a plurality of corresponding combining positions for the two image frames, so one predictive value which has a minimum distance to the predictive value for the combining information is selected from the candidate values for the combining information corresponding to these combining positions and is regarded as the calculating values for the combining information corresponding to the image frames. As shown in FIG. 3, the predictive value for the direction for combining of the $196^{th}$ image frame is Low Right, the predictive value for the horizontal displacement for combining is 38, and the predictive value for the vertical displacement for combining is 8. Thus, the distance from the first candidate value for the combining information for the $196^{th}$ image frame to the predictive value for the combining information is |14−38|+|0−8|=42 and the distance from the second candidate value for the combining information for the $196^{th}$ image frame to the predictive value for the combining information is |37−38|+|8−8|=1, so the second candidate value is selected as the calculating value for the combining information for the $196^{th}$ image frame.

In the step of d), when the updating value of the combining information for the current frame is calculated, if the current frame is a reference frame, the calculating value for the combining information for the current frame is regarded as the updating value for the combining information for the current frame. If the current frame is a predictive frame, when the number of the skip frames in the current group of image frames is 0, the updating value for the combining information for the current frame is the calculating value for the combining information for the current frame; otherwise, the calculating value for the direction for combining of the current frame is regarded as the updating value for the direction for combining of the current frame. A calculation is performed on the basis of the calculating value for the horizontal displacement for combining of the current frame, the calculating value for the horizontal displacement for combining of the reference frame in the current group of image frames and the number of the skip frames within the current group of image frames to obtain the updating value for the horizontal displacement for combining of the current frame. A calculation is performed on the basis of the calculating value for the vertical displacement for combining of the current frame, the calculating value for the vertical displacement for combining of the reference frame in the current group of image frames and the number of the skip frames within the current group of image frames to obtain the updating value for the vertical displacement for combining of the current frame.

In the present embodiment, the apparatus for scanning and recognizing characters takes uniformly accelerated motion. The horizontal displacement for combining of the reference frame in the current group of image frames is taken as an example. When the current frame is a predictive frame and the number of the skip frames in the current group of image frames is more than 0, on the assumption that the calculating value of the horizontal displacement for combining of the reference frame in the current group of image frames is $s_u$, the calculating value of the horizontal displacement for combining of the current frame is s, and the numbers of the skip frames in the current group of image frames is n, so the updating value for the horizontal displacement for combining of the current frame is $(2s−ns_u)/(n+2)$.

As shown in FIG. 6, for example, if the $6^{th}$ image frame is a predictive frame, the reference frame in the current group of image frames is the $2^{nd}$ image frame, the number of the skip frame is 3. The calculating value of the direction for combining of the $6^{th}$ image frame is regarded as the updating value of the direction for combining of the $6^{th}$ image frame, the calculating value of the horizontal displacement for combining of the reference frame in the current group of image frames is 0, and the calculating value of the horizontal displacement for combining of the current image frame is 5. Thus, the updating value of the horizontal displacement for combining of the current image frame is $(2×5−3×0)/(3+2)=2$. In similar manner, it may be obtained by calculation that the predictive value of the vertical displacement for combining of the current image frame is 0. For example, if the $124^{th}$ image frame is a predictive frame, the reference frame for the current group of image frames is the $122^{nd}$ image frame and the number of the skip frame is 1 The calculating value for the direction for combining of the $124^{th}$ image frame is regarded as the updating value of the direction for combining, the calculating value for the horizontal displacement for combining of the reference frame in the current group of image frames is 9, and the calculating value of the horizontal displacement for combining of the current image frame is 19, so the updating value of the horizontal displacement for combining of the current image frame is $(2×19−1×9)/(1+2)=10$. In similar manner, it may be obtained by calculation that the predictive value of the vertical displacement for combining of the current image frame is 4.

The present method processes frame by frame when the apparatus for scanning and recognizing characters scans, after it processes the current frame, it turns to the step of a) to process the next frame of the current frame until the updating value for the combining information for all the reference frames and predictive frames in the image frame sequence are calculated. When the apparatus of scanning and recognizing characters performs one scanning process on the text page, for the last image frame in the image frame sequence, the frame attribution of such an image frame is set as a predictive value so as to form a complete group of image frames. After the frame attribution of the image frame is set as a predictive frame, the method turns to the step of a), the step of b), the step of c) and the step of d) to get the updating value for the combining information for the predictive frame, so that the updating values for the combining information for all the reference frames and predictive frames in the image frame sequence are calculated.

Figure 7:
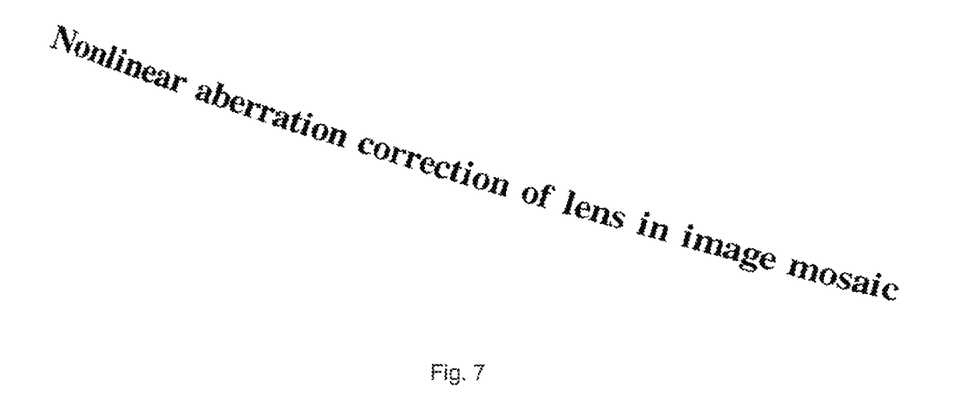
FIG. 7 is binary images of the panorama image in the embodiment of apparatus and method of scanning and recognizing characters according to the present invention.

In the step of e), a panorama image can be obtained from the respective reference frames and predictive frames in the image frame sequence as well as the combining information corresponding to the respective reference frames and predictive frames. In the embodiment, the finally obtained panorama image of a binary image is shown in FIG. 7.

Figure 8:
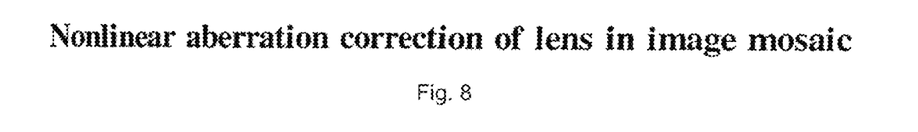
FIG. 8 is a schematic view of a binary panorama image in the embodiment of apparatus and method of scanning and recognizing characters according to the present invention after an inclination correction is performed.

In the step of 3), the control module calls the character recognizing engine in the memory to perform character recognition on the resultant panorama image, before which an inclination correction is performed based on the panorama image. When the respective characters in the panorama image form a line of text along the horizontal direction, as shown in FIG. 8, the character recognizing engine is employed to recognize to get the character codes of the characters. The character codes of the characters obtained by recognition are stored in the memory. The display unit may utilize the character stored in the memory and display the recognized characters on the liquid crystal screen. The control module may send the character coding of the scanned character to the TTS module according to the control signal and the TTS module outputs a voice of an actual person.

The present invention discloses an apparatus and a method for scanning and recognizing characters which combines images for the image frame sequence. In the image frame sequence, except the situation in which there are overlapping contents between the current image frame and its previous one image frame, there is other situation in which there are overlapping contents between the current image frame and its previous one or more image frames. In order to increase the processing speed for combining image frame sequence, to decrease the processing load of the control module and to improve the correctness for combining, the present invention selects the image frames in the image frame sequence captured by optical sensors by a control module, in which except the first fame is used to initialization, the remaining image frames are divided into a plurality of continuous groups of image frames according to the distance between the image frames; after the group of image frames is defined, the present invention only performs calculation of combining for the reference frame and the predictive frame in one group of image frames and the calculation of combining for the skip frames in the group of image frames can be directly skipped, so that the speed of combining the image frame sequence is increased. Since the respective image frames in the image frame sequence are obtained by continuously sampling at an equal time interval, the displacement of motion and the direction of motion between the neighboring image frames are flat. Thus, the combining information for the current frame can be predicted according to the combining information for the previous image frames and the calculating value of the current frame can be obtained from the predictive value of the combining information, so as to more precisely predict the combining information for the current frame. The correctness of combining the image frame sequence is largely improved by such a predicting mechanism.

The apparatus and method for scanning and recognizing characters provided by the present invention have been illustrated in detailed. A particular example is used in the description to explain the principle and embodiments of the present invention. The illustration for the above embodiments is only used to help to understand the method and its kernel idea of the present invention. For those skilled in the art, there are variants in the particular embodiment and scope of application. To sum up, the contents in the specification can't be illustrated to limit the present invention.

What is claimed is:

1. An apparatus of scanning and recognizing characters, comprising:
    an optical sensor for capturing images, the optical sensor continuously capturing scanned characters to obtain an image frame sequence containing the scanned characters, each image frame in the image frame sequence containing contents being partially overlaps with content of its previous one frame; and
    a controller for processing images and recognizing characters, according to the overlapping contents, the controller dividing the image frames in the image frame sequence into groups of image frames in which each group includes a reference frame, a predictive frame and optionally some skip frame, and combining the reference frame and the predictive frame to a panorama image group by group, performing an inclination correction based on the panorama image and performing a character recognition to get the character codes of the scanned characters, wherein the controller is further configured for:
    setting a frame attribution of the current frame in the image frame sequence to form groups of image frames, which includes the reference frame, the predictive frame and the skip frame, the reference frame is a first frame of one group of image frames, the skip frames are the image frame between the reference frame and the predictive frame, the numbers of the skip frame is determined by the overlapping contents among the image frames, and the predictive frame is a last frame in one group of image frames;
    calculating a predictive value of the combining information for the current frame according to an updated value of the combining information for a previous image frame which has a combining information, if the frame attribution of the current frame is a reference frame or a predictive frame;
    evaluating candidate values of the combining information for the current frame according to the predictive value of the combining information for the current frame, to obtain a calculating value of the combining information for the current frame;
    calculating an updating value of the combining information for the current frame according to the calculating value of the combining information for the current frame and turning to the setting unit until the updating value of the combining information for all the reference frame and predictive frames in the image frame sequence have been calculated; and
    combining image frames to a panorama image according to the calculating value of the combining information for the respective reference frame and predictive frame.

2. The apparatus according to claim 1, wherein the number of skip frames in one group of image frames is more than 0.

3. The apparatus according to claim 1, further comprising a display for displaying the recognized characters.

4. A method of scanning and recognizing characters, comprising the following steps:
    a step of 1) continuously capturing character images to obtain an image frame sequence containing characters, each image frame in the image frame sequence containing contents which partially overlaps with contents of its previous frame;
    a step of 2) according to the overlapping contents, dividing the image frames in the image frame sequence into groups of image frames in which each group includes a reference frame, a predictive frame and optionally some skip frames, and combining the reference frame and the predictive frame to a panorama image group by group;
    a step of 3) performing an inclination correction based on the panorama image and performing a character recognition to get the character codes of the characters, wherein the step of 2) comprising:
    a step of a) setting a frame attribution for the current frame in the image frame sequence to form groups of image frames, which includes the reference frame, the predictive frame and optionally some skip frames, the reference frame is a first frame of one group of image frames, the skip frames are the image frames between the reference frame and the predictive frame, the number of the skip frames is determined by the overlapping contents among the image frames, and the predictive frame is a last frame in one group of image frames;

a step of b) calculating a predictive value of the combining information for the current frame according to an updated value of the combining information for a previous image frame which has a combining information, if the frame attribution of the current frame is a reference frame or a predictive frame;

a step of c) evaluating candidate values of the combining information for the current frame according to the predictive value of the combining information for the current frame to obtain a calculating value of the combining information for the current frame;

a step of d) calculating an updating value of the combining information for the current frame according to the calculating value of the combining information for the current frame and turning to the step of a) until the updating value of the combining information for respective reference frame and predictive frames in the image frame sequence have been calculated; and a step of e) combining to obtain a panorama image according to the calculating value, obtained by the step of c), of the combining information for all the reference frame and predictive frames.

5. The method according to claim 4, wherein prior to the step of a), further comprising a step of setting the frame attribution of the first frame in the image frame sequence as a predictive frame, setting its updating value of horizontal displacement for combining as 0, setting its updating value of vertical displacement for combining as 0, and setting an updating value of the direction for combining as Low Right.

6. The method according to claim 4, wherein in the step of a), the number of the skip frame is determined by the updating value of the displacement for combining among the image frames.

7. The method according to claim 4, wherein in the step of a), when the frame attribution of all the respective image frames in the group of image frames are set, it is judged according to the frame attribution of the previous one image frame of the current frame as follows:

if the frame attribution of the previous one image frame of the current frame is a predictive frame, the frame attribution of the current frame is set as a reference frame;

if the frame attribution of the previous one image frame of the current frame is a reference frame, the number of the skip frames in the group of image frames is calculated according to the updating value for the combining information of the previous one image frame, the frame attribution of the last frame in the group of image frames is set as a predictive frame and the frame attribution of the image frames between the reference frame and the predictive frame are set as a skip frame.

8. The method according to claim 4, wherein the combining information in the step of b) comprising direction for combining, horizontal displacement for combining and vertical displacement for combining.

9. The method according to claim 4, wherein in the step of b), when the predictive value of the combining information for the current frame is calculated, the combining information for the current frame is obtained by prediction as follows:

If the current frame is a reference frame, the updating value of the corresponding combining information for the previous image frame of the current frame is regarded as the predictive value of the combining information for the current frame;

If the current frame is a predictive frame, the predictive value of the combining information for the current frame is calculated according to the updating value of the combining information for the reference frame in the current group of image frames.

10. The method according to claim 9, wherein when the predictive value of the combining information for the current frame is calculated according to the updating value of the combining information corresponding to the reference frame of the current group of image frames, the updating value of the direction for combining of the reference frame of the current group of image frames is taken as the predictive value of the direction for combining of the current frame, which is embodies as follows:

the predictive value of the horizontal displacement for combining of the current frame is calculated according to the updating value of the horizontal displacement for combining of the reference frame, the updating value of the horizontal displacement for combining of the previous image frame for the reference frame and the number of the skip frames in the current group of image frames;

the predictive value of the vertical displacement for combining of the current frame is calculated according to the updating value of the vertical displacement for combining of the reference frame, the updating value of the vertical displacement for combining of the previous image frame for the reference frame and the number of the skip frames in the current group of image frames.

11. The method according to claim 4, wherein in the step of c), when evaluating candidate values of the combining information for the current frame according to the predictive value of the combining information for the current frame to obtain a calculating value of the combining information for the current frame, a filter window centered on the predictive value of the combining information for the current frame is formed, the combining coefficience for each pixel within the filter window is calculated and the combining information at the pixel corresponding to the maximum of the combining coefficience is regarded as the calculating value of the combining information for the current frame.

12. The method according to claim 11, wherein in the step of c), when evaluating candidate values of the combining information for the current frame according to the predictive value of the combining information for the current frame to obtain a calculating value of the combining information for the current frame, if there is more than one candidate value for the combining information, one candidate value which has a minimum distance to the predictive value for the combining information is selected from the candidate values for the combining information as the calculating values for the corresponding combining information.

13. The method according to claim 4, wherein the candidate value for the combining information in the step of c) refers to the combining information corresponding to the candidate combining positions for the current frame.

14. The method according to claim 13, wherein the candidate values of the combining information for the current frame is obtained by the follows steps of:

calculating combining coefficience of for all the possible combining positions of the two image frames after binarization, and selecting candidate combining positions according to the size of the combining coefficience, the combining information corresponding to the respective candidate combining positions being the candidate values of the combining information for the current frame.

15. The method according to claim 14, wherein the combining coefficience is the value which is obtained by the number of the black pixels superpositioned at the overlapping regions of the two image frames after binarization being divided by the total number of the black pixels within the overlapping region.

16. The method according to claim 4, wherein in the step of d), when the updating value of the combining information for the current frame is calculated,
   if the current frame is a reference frame, the calculating value of the combining information for the current frame is regarded as the updating value of the combining information for the current frame;
   if the current frame is a predictive frame, the updating value of the combining information for the current frame is calculated according to the numbers of the skip frames of the current group of image frames.

17. The method according to claim 16, wherein calculating the updating value of the combining information for the current frame according to the numbers of the skip frames of the current group of image frames comprising:
   if the number of the skip frame in the current group of image frames is equal to 0, the calculating value of the combining information for the current frame is regarded as the updating value of the combining information for the current frame; and
   if the number of the skip frames in the current group of image frames is more than 0, the calculating value for the direction for combining of the current frame is regarded as the updating value for the direction for combining of the current frame; the updating value for the horizontal displacement for combining of the current frame is calculated on the basis of the calculating value for the horizontal displacement for combining of the current frame, the calculating value for the horizontal displacement for combining of the reference frame and the numbers of the skip frames within the current group of image frames; and the updating value for the vertical displacement for combining of the current frame is calculated on the basis of the calculating value for the vertical displacement for combining of the current frame, the calculating value for the vertical displacement for combining of the reference frame and the number of the skip frames within the current group of image frames.

18. The method according to claim 4, wherein before performing character recognition, an inclination correction is performed on the resultant panorama image, so that the respective characters in the panorama image form a line of text along the horizontal direction.

* * * * *